Figure 1:
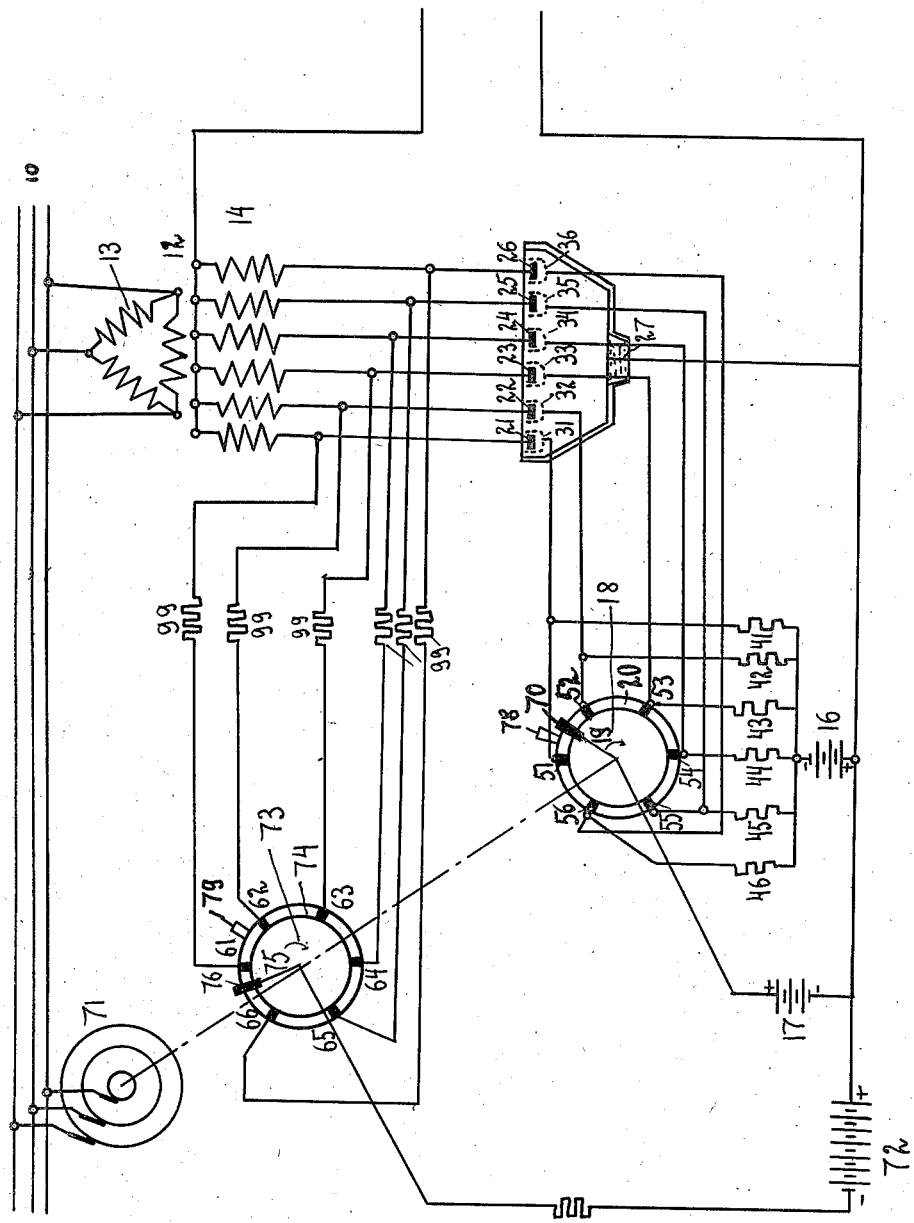

May 4, 1937.                J. NEUFELD                 2,079,084
                    ELECTRIC VALVE CONVERTING APPARATUS
                    Filed July 11, 1934         3 Sheets-Sheet 1

Inventor
Jacob Neufeld

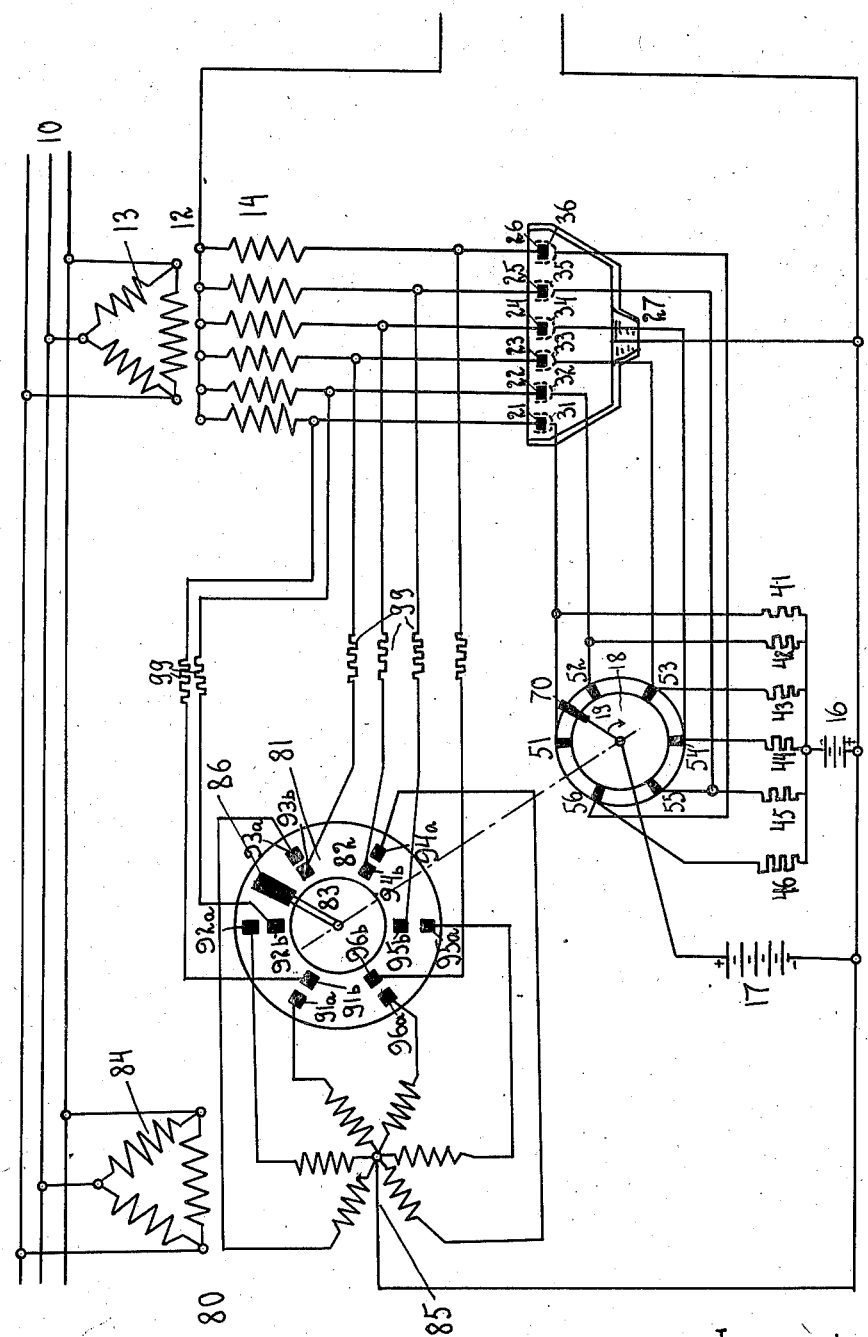

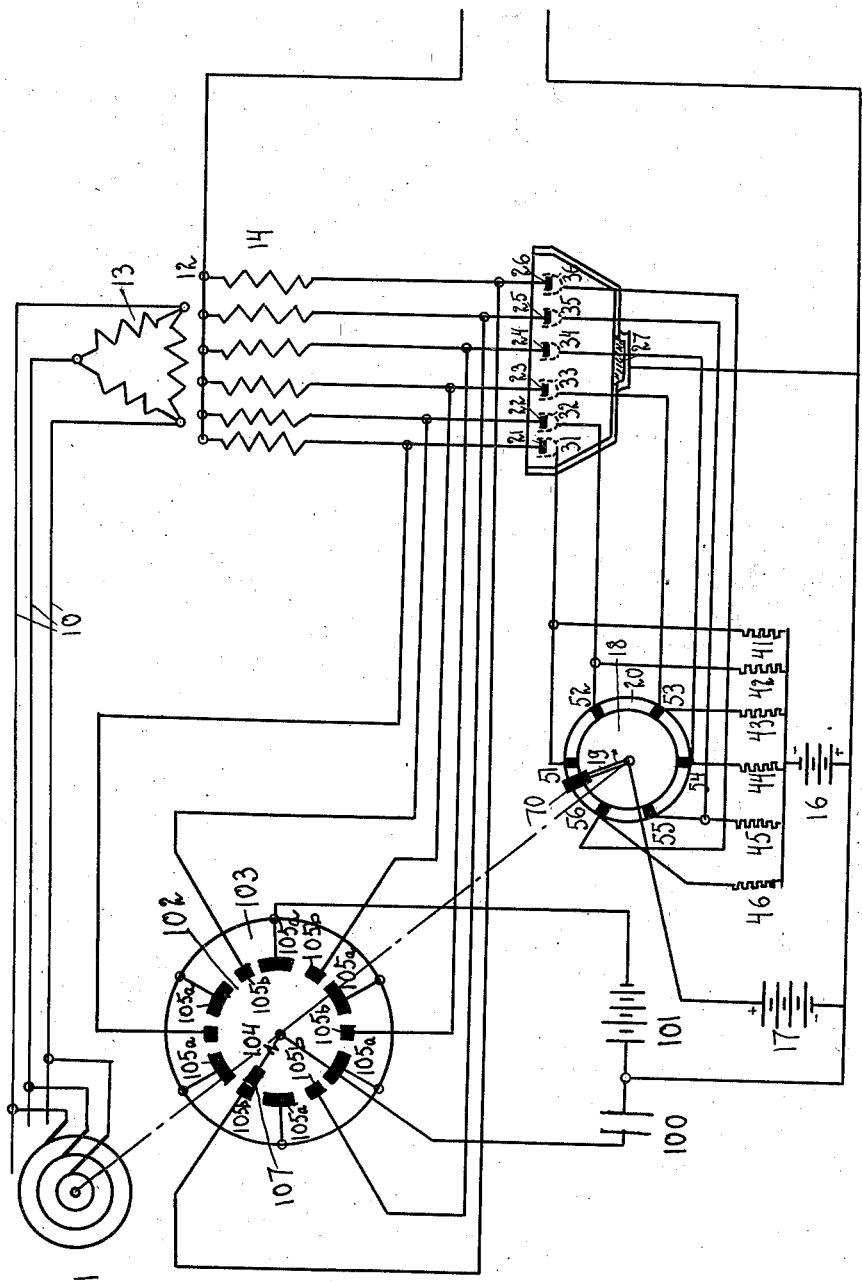

Patented May 4, 1937

2,079,084

UNITED STATES PATENT OFFICE 2,079,084

ELECTRIC VALVE CONVERTING APPARATUS

Jacob Neufeld, Philadelphia, Pa.

Application July 11, 1934, Serial No. 734,585

4 Claims. (Cl. 175—363)

My invention relates to electric valve converting apparatus, and more particularly to such apparatus adapted to convert direct current into alternating current or to convert alternating current of one frequency into alternating current of a different frequency.

Heretofore there have been devised numerous apparatuses including electric valves for transmitting energy between direct and alternating current circuits, or alternating current circuits of different frequencies, phases and voltages. Many of the arrangements of the prior art have comprised a polyphase inductive network inductively or conductively connected to the alternating current circuit and interconnected with the direct current circuit through a plurality of electric valves which are adapted to be rendered alternately conductive and nonconductive. The use of vapor electric discharge valves in such apparatuses has been found particularly advantageous because of the relatively large amounts of power which may be handled at ordinary operating voltages. On the other hand the use of valves of this type imposed certain limitations upon the arrangements of the prior art because of the commutation requirements of this type of valve. It is well understood in the art that the grid of a vapor electric discharge valve is effective in controlling the starting current in the valve, but that the current through the valve may be interrupted only by reducing the anode potential below its critical value. It is also known by those skilled in the art that under certain power factor conditions the electromotive force of the inductive windings interconnecting the valves opposes the commutation of the current from one valve to another.

It is an object of my invention, therefore, to provide an improved electric valve converting system which will overcome the above mentioned disadvantages of the arrangements of the prior art and which will be simple and reliable in operation.

In accordance with my invention direct and alternating current circuits or alternating current systems of different frequencies are interconnected through an inductive winding, or a network of inductive windings, and a plurality of electric valves. The several electric valves are successively rendered alternately conductive and nonconductive and the current is transferred between successive valves under any desired power factor conditions on the alternating current circuit at points in the cycle when the fundamental alternating potential of the inductive winding or windings connecting the successive valves opposes commutation. This is done by introducing into the system negative voltage impulses of peaked wave form which momentarily depress the anode potentials of valves carrying current and make them inactive. The duration of these impulses must be sufficient to permit to the valves to deionize.

For a better understanding of my invention together with other and further objects thereof, reference is had to the following description taken in connection with the accompanying drawings and its scope will be pointed out in the appended claims.

In the accompanying drawings Fig. 1 represents an embodiment of my invention for transmitting energy in either direction between a direct current circuit and six phase alternating current circuit, while Fig. 2 and Fig. 3 illustrate some modifications of my invention.

Referring now particularly to Fig. 1 of the drawings there is illustrated an arrangement for transmitting energy between three phase alternating current circuit 10 and a direct current circuit 11. For the practicing of my invention it is immaterial whether the apparatus is operating as a rectifier, transmitting energy from the alternating current circuit 10 to the direct current circuit 11, or as an inverter, transmitting energy in the opposite direction. This apparatus includes a transformer 12 provided with a winding 13 connected to the circuit 10 and a winding 14 provided with an electrical midpoint connected to one side of the direct current circuit 11 and with end terminals connected to the lower side of the direct current circuit 11 through the anodes 21–26 incl., respectively and a cathode 27. The arrangement shown on the Fig. 1 is particularly suitable for employing a plurality of electric valves or valve paths having a single cathode potential, for example, when employing a multiple anode, grid controlled mercury arc rectifier. Control electrodes (called grids) 31–36 incl., are severally associated with the anodes for the purpose of controlling the conductivity of the corresponding anode paths. A negative potential relative to the potential of the cathode is continuously impressed on each of the control electrodes from a suitable source connected with the cathode, such as a battery 16 and a suitable resistances such as 41–46 inc. Each control electrode is also sequentially energized at a positive potential with respect to the associated cathode potential from a suitable source such as a battery 17 through the contact apparatus 18 consisting of a stationary part 20 containing segments 51–56 incl. distributed uniformly on a circle and of a brush 19 capable of turning around the centre of the circle and having only one contact 70. The brush 19 may be rotated by a synchronous motor 71 which may be energized from the line 10.

This particular arrangement for controlling the grids by means of a rotating distributor forms no part of my present invention and it is well known in the art.

However the positive voltage impulses which are supplied to the respective grids from the battery 17 through the rotating distributor 18 are effective in controlling only the start of the discharge between the cathode and the corresponding anode. In order to interrupt the current passing through any of the valves it would be necessary to impress upon it a negative voltage impulse which will reduce its anode potential below its critical value. The negative voltage impulses are supplied by the battery 72 which is connected to the anodes 21–26 incl. over a contact apparatus 73. The contact apparatus 73 consists of a stationary contact part 74 with six contacts 61–66 incl. distributed uniformly on a circle, and of a brush 75 capable of turning with respect to it and having only one contact 76. The shaft of this contact is connected to the negative terminal of the voltage supply 72. In explaining the operation of the above described apparatus it will be assumed that the rotating members of the distributors 18 and 73 are in the position indicated. Under these conditions it will be noted that the current is flowing through the anode 21 and all the grids associated to the anodes 21–26 incl. respectively, are subjected to a negative grid bias supplied by the battery 16. The brushes 75 and 19 of the mechanical distributors 73 and 18 are rotating synchronously in the clockwise direction as indicated on the figure. A few instants later the brush 19 of the mechanical distributor 18 will occupy a new position such that the contact 70 will be opposite to the contact 52. Consequently the battery 17 will send a positive voltage impulse to the grid 32 which will overcome the negative bias of the battery 16 and will render the path from anode 22 to cathode 27 conductive. At the same instant, however, the rotating contact 76 of the contact apparatus 73 will make contact with the contact 61. This has the effect of closing momentarily the circuit containing the D. C. source 72 and the path between the anode 21 and the cathode 27. Consequently the anode 21 will receive a negative voltage impulse, which will depress its potential below its critical value and interrupt the current flowing through this anode. Thus by sending simultaneously a positive voltage impulse to the grid of the anode 22 by the means of the distributor 19 and a negative voltage impulse to the anode 21 by means of the distributor 73 we can assure the transfer of current from anode 21 to anode 22. This process is repeated cyclically corresponding to phase sequence in the same manner. The rotating brushes 75 and 19 on the same shaft 77 and are both driven preferably by a synchronous motor 71 energized from the alternating current circuit 10.

The stationary parts 20 and 74 of the contact apparatus 18 and 73 may be displaced one from another by the means of handles 78 and 79 respectively. By displacing the stationary part 74 of the contact apparatus 73 we can change the phase position of the negative voltage impulses supplied by the source 72 with respect to the anode voltages. By properly displacing the stationary part 20 of the contact apparatus 18 we can change the phase position of the positive voltage impulses supplied by the generator 17 to the grids. By properly displacing the stationary part of the distributor 74 with respect to the stationary part of the distributor 18 we can make coincide the moment of interrupting the current in any given valve with the moment of arcing of any other valve or we can delay the moment of complete commutation by interrupting the current in any given valve in a certain period of time after the moment of arcing of another valve. In the latter case we can regulate the period of time during which several valves may work in parallel.

In the scheme of the Fig. 1 the numeral 99 designates resistors which may be included in the circuits carrying the voltage impulses. It is understood that for this resistor may be substituted a reactor or a capacitor or any combination of the three.

Fig. 2 illustrates a modification of the invention in which, in place of continuous current, an alternating current is employed as a source of the negative voltage impulses. For simplicity I will merely explain the operation of a portion of the system shown in Fig. 2, but the manner in which the other parts of the circuit are connected and how they function will be evident since like numerals have been used for similar elements in Fig. 1 and in Fig. 2.

In the Fig. 2 the contact apparatus 73 and the source of voltage supply 72 have been replaced by the contact apparatus 81 and the transformer 80 respectively. The transformer 80 consists of a primary 84 connected to the circuit 10 and of a secondary winding 85 provided with a neutral point which is connected to the cathode 27. From this transformer the voltage surges are taken and conveyed by means of the contact apparatus 81 consisting of a stationary contact plate 82 and of a rotating brush 83. The contact plate 82 has a number of double contacts 91a—91b; 92a—92b; 93a—93b; 94a—94b; 95a—95b; 96a—96b; corresponding to the number of anodes 21–26 incl. Each of the contacts 91a, 92a, 93a, 94a, 95a, and 96a is connected to the corresponding phase of the winding 80 and each of the contacts 91b, 92b, 93b, 94b, 95b, 96b is connected to the corresponding anodes 21–26 incl. The rotating brush 83 is provided with a single contact 86 which covers consecutively each of the double contacts 91a—91b; 92a—92b; 93a—93b; 94a—94b; 95a—95b; 96a—96b; during its rotation, and in such a way enables the corresponding phases of the winding 80 to send negative voltage impulses to the corresponding anodes.

Fig. 3 represents a modification of the arrangement for producing the negative voltage impulses which interrupt the current passing through the anodes. The negative voltage impulses interrupting the current passing through the anode, which depresses the anode voltage below its critical value is taken from the condenser 100 which is charged from the battery 101. The negative terminal of the condenser is connected to the anodes 21—26 of the rectifier over a contact apparatus 102. The contact apparatus consists of a stationary plate 103 with twelve contacts 105a and 105b distributed uniformly on a circle and of a part 104 capable of rotating with respect to it and having only one contact 107. The shaft of the rotating member 104 is conected to the negative plate of the condenser 100. Of the 12 contacts of the stationary part the 6 contacts 105a are connected to one another and to the negative pole of the battery 101 while the 6 contacts 105b are connected to the corresponding anode leads. The contacts 105a lie in the spaces between the contacts 105b. As soon as the rotating contact 107 comes opposite one of the contacts 105b, the condenser 100 supplies a negative voltage impulse to the associated anode and thus interrupting the current.

This process is repeated cyclically corresponding to phase sequence in the same manner. In each interval between the discharges of the condenser 100 over the contacts 105b the condenser 100 is charged by the D. C. source 101 over the contacts 105a.

While I have illustrated my invention as embodied in arrangements for transmitting energy from a 6 phase alternating current supply circuit to a direct current circuit, it will be obvious to those skilled in the art that my invention is of general application to arrangements for transmitting energy from an alternating current supply circuit of any number of phases and any frequency to an alternating current circuit of any number of phases and frequency.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A system for transmitting energy between direct current and alternating current circuits or between alternating current circuits of different frequencies, phases and voltages, comprising polyphase networks of inductive windings and a plurality of gas discharge valves, each having main electrodes and a control electrode cooperating therewith, interconnecting said circuits, a first source of substantially steady potential, means connected to said source including a distributing device for applying successive discharge initiating potential to the control electrodes of said valves, a second source of substantially steady potential, further means connected to said second source including a second distributing device for applying negative voltage impulses to successively interrupt the current through said valves associated with the successive phase windings, said distributing devices having stationary and moving parts, means for operating said moving parts in synchronism with the alternating current, and means for displacing the stationary parts relative to one another.

2. A system as claimed in the preceding claim in which said second source is successively connected parallel to said valves by said second distributing device, and high ohmic resistance devices connected between said second source and said valves.

3. A system for transmitting energy between direct current and alternating current circuits or between alternating current circuits of different frequencies, phases and voltages, comprising polyphase networks of inductive windings and a plurality of electric gas discharge valves cooperating therewith for interconnecting said circuits, control electrodes for said valves, a first source of substantially steady potential, means connected to said source including a first distributor for supplying discharge starting potential to the control electrodes of said valves, a further source of substantially steady potential, means connected therewith including a further distributor for supplying substantially steady negative voltage impulses to interrupt the current through said valves associated with the successive phase windings, said distributors having stationary and rotating parts, the rotating parts being mounted on the same shaft, and means for displacing said stationary parts relative to one another.

4. A system for transmitting energy between direct current and alternating current circuits, or between alternating current circuits of different frequencies, phases and voltages, comprising polyphase networks of inductive windings and a plurality of gas discharge valves cooperating therewith for interconnecting said circuits, said valves having cathodes, anodes, and control electrodes; a source of potential; a first control means connected to said source and operating in synchronism with the alternating current for sequentially impressing discharge starting potentials upon the control electrodes of said valves associated with the successive phase windings; a further source of potential; a second control means connected to said last source and also operating in synchronism with the alternating current for sequentially impressing discharge interrupting potential upon the anodes of said valves associated with the successive phase windings; and means for adjusting the time phase relation between said first and second control means.

JACOB NEUFELD.